United States Patent

Hengstler et al.

[11] 3,921,875
[45] Nov. 25, 1975

[54] CONTROL DEVICE

[75] Inventors: Heinz Hengstler, Oakhurst; Robert M. Groll, Freehold, both of N.J.

[73] Assignee: Hecon Corporation, New Shrewsbury, N.J.

[22] Filed: May 12, 1972

[21] Appl. No.: 252,842

Related U.S. Application Data

[63] Continuation of Ser. No. 42,283, June 1, 1970, abandoned.

[52] U.S. Cl. ........ 235/92 CT; 235/92 R; 235/92 PE; 235/92 AC
[51] Int. Cl.² .................... G06M 3/02; G07C 3/10
[58] Field of Search ........ 235/92 CT, 92 PE, 92 AC

[56] References Cited
UNITED STATES PATENTS

| | | | |
|---|---|---|---|
| 3,436,530 | 4/1969 | Faude | 235/92 CT |
| 3,492,779 | 2/1970 | Russell | 235/92 PE |
| 3,500,342 | 3/1970 | Bissett | 340/173 |
| 3,558,004 | 1/1971 | Boyd | 235/92 PE |
| 3,670,924 | 6/1972 | Asper | 235/92 PE |

*Primary Examiner*—Joseph M. Thesz, Jr.
*Attorney, Agent, or Firm*—Ostrolenk, Faber, Gerb & Soffen

[57] ABSTRACT

A control device of either the electromechanical or electronic-type for limiting the time, distance or quantity production of a machine, or other apparatus, being monitored in accordance with the pre-set value set into the control device to control production quantities. For example, the control device will count up to the quantity allotted, and, subsequent thereto, will operate switch means to automatically shut off the production equipment being monitored until the control device is reset by authorized personnel. If desired, a "warning" signal may be emitted to indicate that the control quantity set in the control device is close to being exhausted.

A device is also provided for automatic and rapid replenishment of the controlled quantity within the control device, which resetting may be performed only by authorized personnel.

1 Claim, 9 Drawing Figures

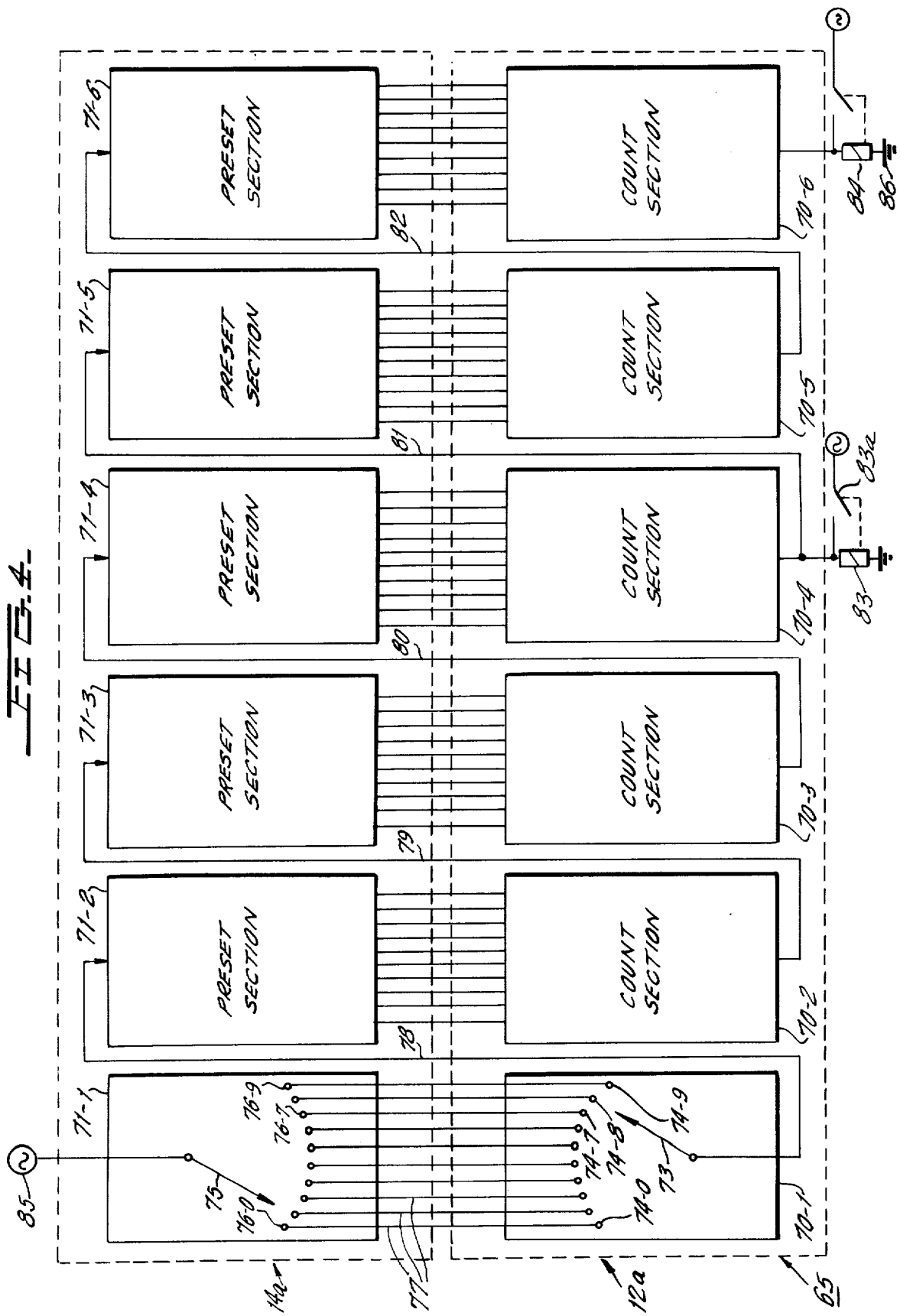

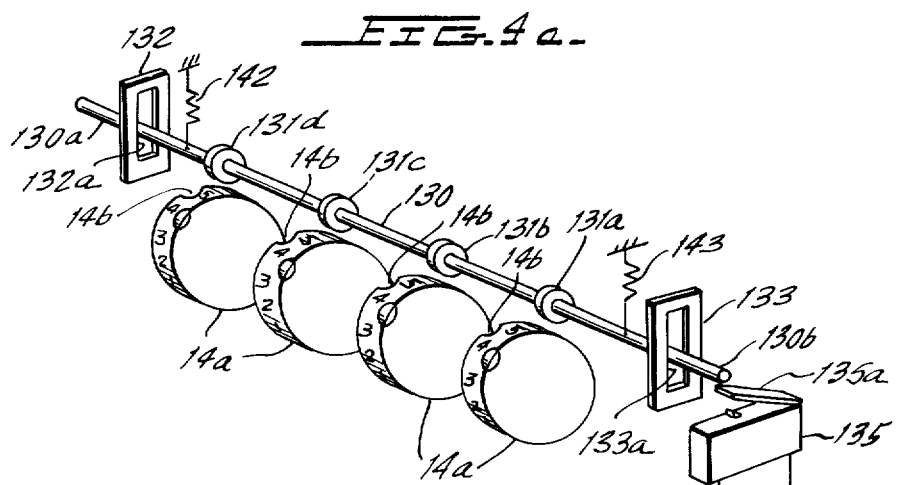
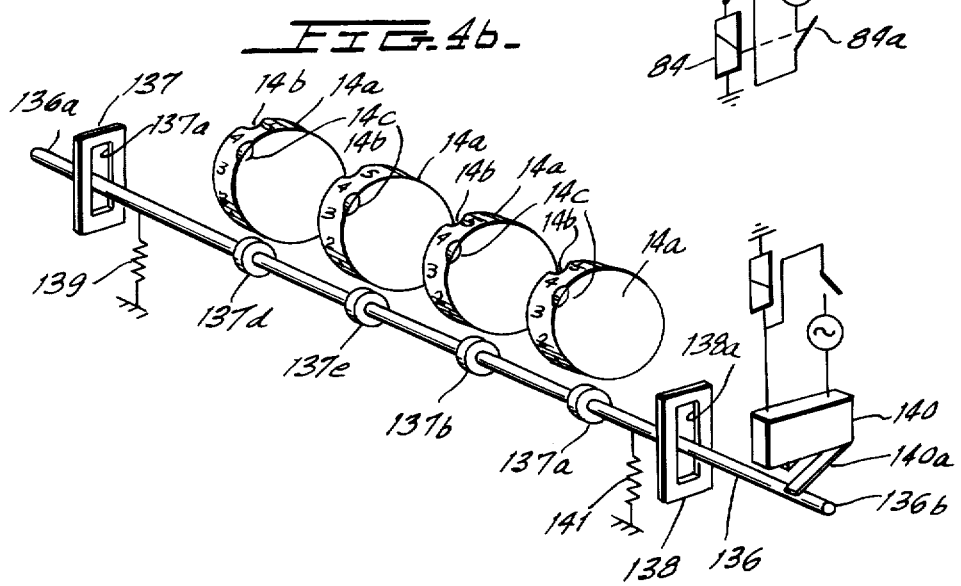
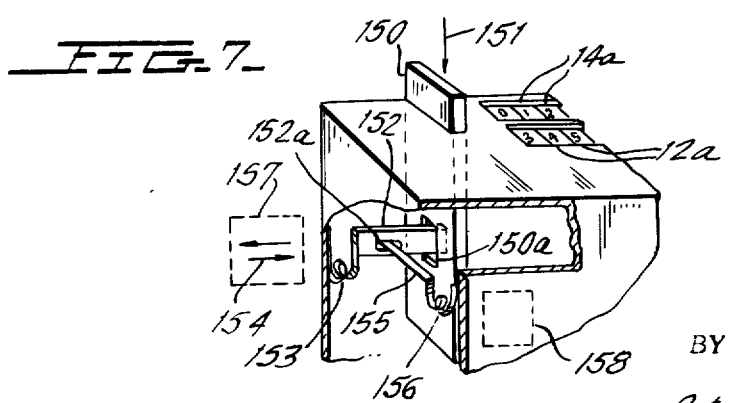

CONTROL DEVICE

This is a continuation of application Ser. No. 42,283, filed June 1, 1970 now abandoned.

The present invention relates to control devices, and more particularly to a novel control device having a pre-set controlled quantity which limits the time, distance or output production quantity of the machine or apparatus being monitored, and which includes means for automatically resetting or replenishing the desired controlled amount.

There exist a variety of applications in which it is desired to permit the access or usage of a particular machine or apparatus by only qualified personnel. One particular type of apparatus which permits usage of a machine by only authorized personnel is set forth in U.S. Pat. No. 3,436,530, issued Apr. 1, 1969, and assigned to the assignee of the present application. The device described therein permits authorized personnel to unlimited access to a copier machine, or other similar device, regardless of the total amount of usage desired by the authorized personnel. The device described in the above-mentioned U.S. patent is primarily concerned with limiting the access to copier machines and other devices to only authorized personnel, i.e., those personnel which have in their possession a "key counter" device which, when inserted into the master control device, permits usage of the copier machine. The system described in the above-mentioned U.S. patent, however, has the severe limitation of providing no control means whatsoever over the total usage of the machine by authorized personnel. For example, in the case of copier machines, the meter (or meters) which indicate the total quantity of copies run off by the machine is usually read once a month by a representative of the company leasing the copier machine. This information (which may be gathered from a large number of lessees) is then returned to the lessor where it is converted into billing information which is usually prepared at predetermined times within a month which may, for example, be 6 to 8 weeks subsequent to the quantity of copies produced in the month for which the bill is rendered. The payment of the bill by the lessee may be made as much as 2 weeks to 1 month subsequent to receipt of the bill, or even later in the case where the lessee may be tardy in paying. Thus, the renting company has only very loose control, at best, over the leased equipment, creating a serious cash-flow problem.

In another application, a device of the type described in the above-mentioned U.S. Pat. No. 3,436,530 may be employed to control the usage of an automobile. However, the party possessing such a car-key may drive the car whenever he likes and for whatever period he desires. The credit rating of such an individual may be such that the mileage should preferably be limited if such a technique is available to the car rental agency. Also, health or age conditions may require that the driving of the individual be limited to daylight hours or to certain maximum speeds.

Further control problems such as the limiting of excessive current drain, excessive flow of liquid or gas, and the like, may require temporary restriction through such a key device which can be made portable and be reprogrammed or reloaded if new conditions warrant the reloading. For example, in the case of gasoline station applications, it is possible to maintain a regular delivery schedule for replenishing each station with gasoline, but to further limit the quantity of gasoline which any particular gasoline station may extract from the storage tanks, dependent primarily upon the credit rating and past history of payments made by the gas station owner or lessee.

In still a further application, daily commutation tickets for subways, buses, trains, and the like, may be maintained through the use of a monthly permit which need not be checked by an attendant. The use of an appropriate key device having a controlled quantity stored therein to limit the number of uses may be inserted into an appropriately positioned electronic gate which opens only if the key owner has an account balance.

Access to unattended gas pumps at a gasoline station can be had by prepurchasing a certain number of gallons which may be stored into a key opening device to limit the amount of gallons which may be purchased by the holder of such a device.

As further examples, excessive exposure to extreme temperatures, humidity, pressure, radio activity, and the like, which may be dangerous to man and/or equipment, may be regulated by an appropriately preprogrammed device to maintain exposure to such conditions within tolerable limits. An appropriate warning can be provided within the device to indicate when a critical or dangerous value may be achieved within a particular time period.

The present invention is characterized by providing a control device having a capability of storing a controlled amount of energy or a controlled quantity to permit access to a particular machine or apparatus, or exposure to particular conditions which further has the capacity of providing a warning when the controlled amount stored therein is close to exhaustion, and which further automatically prevents access to a machine, or other apparatus, unless and until replenished to another controlled quantity. Replenishment of the control device may also be adapted so as to be capable of being performed by only the authorized personnel, which replenishment may be tied in with billing and payment activities to yield greater control over cashflow of the machinery or apparatus involved.

The present invention, in one preferred embodiment, is comprised of a control device which is positioned in close proximity to and electrically wired into the machine or apparatus over which such control is to be exerted. The control device is provided with an opening having a socket of a predetermined configuration for receiving a "key counter" device. The control device is so designed as to prevent operation of the machine or apparatus being controlled unless and until the key counter is appropriately plugged into the control device.

The key counter may, for example, be an electromagnetic counter of the predetermining-type which is set to a particular quantity. In the case of a copier machine, the quantity set into the key counter may, for example, be equal to an amount which represents the average number of copies produced by the lessee over a period of time which represents the normal time period between two successive billing periods (for example, the number of copies which may be run off by a lessee over the space of 1 month). The lessee may thus obtain the controlled setting in its key counter (or key counters) by personnel of the renting company by paying the renting company an amount equal to the number of copies stored as the controlled amount in the key counter device. The key counter device may be inserted into the control device (preferably by authorized personnel) to unlock the apparatus being controlled to allow the person using the key counter to run off the number of copies desired, which is limited, however, to the controlled quantity set within the counter device. The counter device is further provided with switch means which will automatically operate the control device to prevent any further usage of the copier machine as soon as the controlled quantity originally stored in the key counter device is exhausted. A warning signal may be built into the key counter device to provide a warning, preferably of the audible-type, to indicate that the controlled quantity is near exhaustion and requires replenishment. A further visual warning may take the form of a reading upon the key counter to indicate the total number of copies produced to date or, alternatively, to indicate the number of copies which may still be reproduced before the controlled quantity is exhausted.

The controlled quantity which may be set into the key counter device may be of any variable amount up to the total capacity of the key counter (which, for a six-digit counter, may be 9 9 9, 9 9 9). Resetting may be performed by opening a lock provided on the key counter to gain access to the settable portion of the key counter device and thereby set-in the desired amount. As an alternative, a pulse generating device whose possession may be limited to those representatives of the rental agency who would otherwise normally take monthly readings of conventional meters, may be plugged into a suitable socket device provided on the body of the key counter device to inject a quantity of pulses equal in number to the controlled quantity which the lessee desires to be inserted into the key counter. The pulse generating device may further be provided with its own counter to provide an accurate and accumulative reading of the number of "pulses" (i.e., controlled quantity) provided for any lessee. Although the key counter device may be capable of accepting such pulses at a relatively high rate, and although the pulse generating device may likewise generate pulses at a relatively high rate, the pulse generating device may be further modified to control the application of pulses to a particular digit position of the key counter device to significantly speed up replenishment of the controlled quantity. For example, in the case where the quantity 10,000 is to be set into the key counter device, the pulse generating device may be provided with a manually settable knob or meter which is set to the quantity 10,000 by providing a plug of a unique configuration which plugs in only one way into the socket of a complementary configuration provided in the key counter. The quantity 10,000 may be inserted into the key counter simply by the application of a single pulse to the 10,000 digits position of the key counter, thereby avoiding the necessity for application of 10,000 individual pulses while, at the same time, providing the desired setting.

It is, therefore, one object of the present invention to provide a novel control device for use in controlling the time, distance or quantity production access gain to a machine or other apparatus through the use of a key counter and control device which limits the use of the particular machine or apparatus to the controlled quantity set into the key counter by authorized personnel.

Another object of the present invention is to provide novel means for replenishing a controlled amount into a key counter while, at the same time, providing accurate, accumulative counts of the total number of controlled amount granted to persons using the key counter and control devices.

These as well as other objects of the present invention will become apparent when reading the accompanying description and drawings in which:

FIG. 4 is a circuit diagram showing one scheme for limiting the operating time or productivity of a machine and which may be employed in the control device of FIG. 1.

FIGS. 4a and 4b are perspective views of an alternative (mechanical) scheme which may be substituted for the arrangement of FIG. 4.

FIG. 6 is a perspective view of an electronic device for resetting electrical key devices.

FIG. 7 is a perspective view of a portion of a key device showing the details of a latching mechanism.

Figure 1:
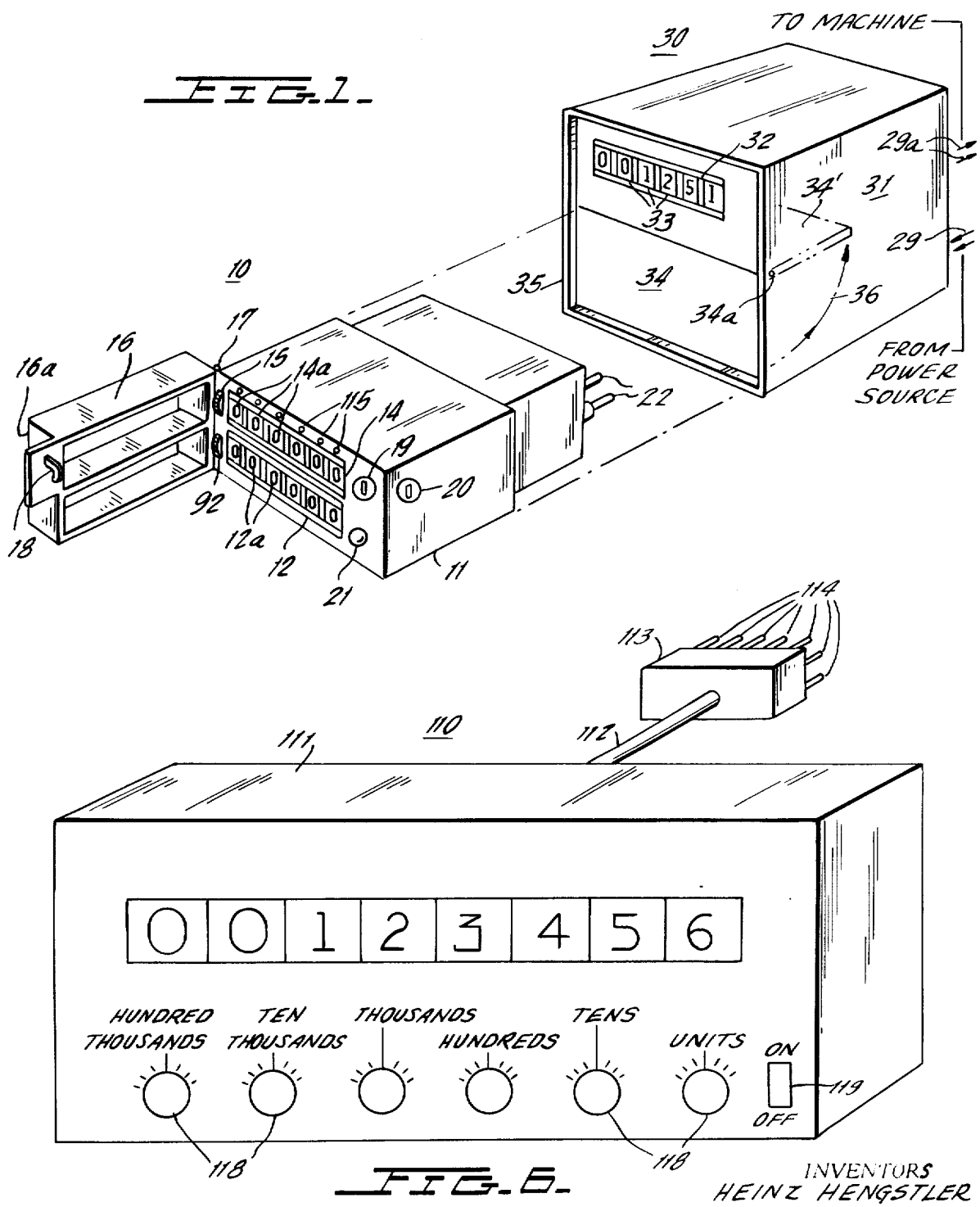
FIG. 1 is a perspective view showing a key counter and control device adapted for receiving the key counter.

Referring now to the drawings: FIG. 1 shows a counter 10 designed in accordance with the principles of the present invention and which is comprised of a substantially completely sealed and tamper-proof housing 11 provided with first and second windows 12 and 14, behind which are positioned the individual number wheels 12a and 14a of a pair of electromechanical counters. The electromechanical counter, for example, may be a type FA 043 manufactured by Hecon Corporation, the assignee of the present invention, as described in the Hecon Counter Catalog No. 043768, published in July 1968. However, any other suitable counters may be employed, It is sufficient to understand that the counter having number wheels 12a is advanced by a relay means and performs a totalizing function. A cumulative count may be read simply by observing the decimal numerals appearing in the window 12 which, in the preferred embodiment, has a capability of counting from 000,000 to 999,999. Housing 11, in addition to containing the counter and its stepping relay, also houses the necessary electronic interlock means for permitting operation of the control device 30, also shown in FIG. 1. The counter having number wheels 14a is a pre-settable device which may be set to any number from 000,000 to 999,999 by means of manually reset means 15. Window 14 and means 15 may be sealed by an enclosure 16 pivotally mounted along the right-hand side of housing 11 by a hinge 17 and having a transparent front face 16a to permit viewing of the number wheels 14a. Enclosure 16 is provided with a hook-shaped member 18 which engages with a locking mechanism 19 so as to prevent the opening of enclosure 16 when in the closed position, thereby preventing access to knob 15. A key-operated lock 20 is provided to permit the enclosure 16 to be opened by only authorized personnel. In brief, the key counter device 10 is releasably inserted into the control device 30 (to be more fully described) to cause the control device to enable the machine or document copier, for example, to be operated. In the case of a copier machine, once the key counter device 10 is inserted into the control device, the control device enables the copier machine to reproduce copies. A running total of the number of copies so produced, with the key counter device 10 in the operative position, is developed by the electromagnetic counter having number wheels 12a. The number wheels 14a display the total number of the copies which may be run off by the key counter before the key counter must be reset. Indication of the number of copies which may still be produced through the use of the key counter device 10 may be readily determined by comparing the count presented by number wheels 12a against the count presented by number wheels 14a. However, additional alarm means in the form of lamp 21 may be provided so as to provide an alarm indication (which may either be in the form of steady illumination or a flashing condition) to indicate the fact that the count presented by number wheels 12a is close to the count presented by number wheels 14a.

As another alternative to the arrangement described hereinabove, the preset section which includes number wheels 14a, may be of a mechanical design in which the number wheels are initially preset by settable means 15. In operation, the preset section is mechanically coupled to the counter section comprised of number wheels 12a and is thereby caused to operate to reduce the quantity presented by number wheels 14a by one count each time a copy is run off until the number wheels 14a present a zero reading indicative of the fact that the preset count set into the preset section has been completely depleted. A counter mechanism which provides this operation may, for example, be the Hecon Counter Type FA 043 described in the Hecon Catalog mentioned elsewhere in this description. This device is of the "delayed transfer" type. In one preferred arrangement, the preset section counts down from the preset quantity while the counter means counts up from zero towards the preset quantity. As an obvious alternative, a predetermining counter of the type FE 043 may be employed in which a single counter is provided with a preset section. Upon depression of the reset button, the counter is preset to the desired number and subtracts one count for each input pulse. At a zero reading, a built-in snap action switch is actuated. A counter of this type is described in the above mentioned Hecon Catalog. Obviously, any of the above mentioned techniques may be employed, depending only upon the needs of the particular user.

The control device 30 is comprised of a housing 31 which is provided with a window 32 along its front face, behind which is mounted a master counter means having number wheels 33 positioned behind window 32. The master counter of control device 30 is basically of the same type as is housed in key counter device 10 and is provided with its own stepping or advancing relay to advance the count in the counter which operates as a grand totalizing device. The master counter may be omitted, if desired, under certain conditions.

The control device is further provided with a hinged front cover plate 34 which is pivoted along its upper end 34a to the side walls of control device 30 by a suitable pivot pin, one end of which is shown at 35. The hinged cover plate 34 substantially seals an opening 35 having a configuration of the perimeter of cover plate 34 which is substantially the same shape as the key counter device 10, but which is slightly larger in dimension so as to readily and simply receive the key counter device within the opening.

FIG. 1 shows the control device 30 with the key counter being removed. In order to insert the key counter 10 into control device 30 the key counter is inserted with its rear end having pins 22 into opening 35 causing the cover plate 34 to pivot about pin 34a and to move from its vertical position shown in solid line fashion, to the horizontal line position 34', shown in dotted fashion and moving in the direction shown by arrow 36. The conductive pins 22 which are arranged in a predetermined planar array, are adapted to be received by similarly arranged associated holes, or openings (not shown) arranged within an interior wall provided within the control device, which interior wall is spaced inwardly from opening 35.

The control device 30 is electrically coupled to the copier machine internal control circuit or through suitable leads 29 to a power source such as, for example, a wall socket. Output leads 29a are electrically coupled to a copier machine, computer, and the like, to provide the functions of inhibiting use of the machine until a key counter device 10, having the proper interlock circuitry, is inserted within control device 30, while further providing the function of maintaining a cumulative count by means of the control device master counter, while at the same time providing a signal to advance the counter of the key counter device 10. The control device 30 may, for example, be attached to a copier machine to maintain a cumulative count in its totalizing master counter which reflects the total number of copies run off by the copier machine. Each individual key counter device of the type shown by device 10 may be assigned to a specific department, and, when inserted into control device 30, is caused to develop its own count reflecting the total number of copies attributed to the particular department having possession of the associated key counter. The particular arrangement between the power source, the control device 30, and the copier machine may, for example, be that described in application Ser. No. 604,962 filed Dec. 27, 1966, now U.S. Pat. No. 3,551,652 issued Dec. 29, 1970 and assigned to the assignee of the present invention. For purposes of understanding the present invention, the electrical plug of the copier machine may be inserted into a socket provided in the control device 30 and locked in this position by suitable locking means so as to prevent defeat of the control device by simply removing the copier machine plug and placing it in a wall socket. Detailed description of a suitable arrangement is set forth in the latter insured patent mentioned hereinabove. If desired, control device 30 may be permanently installed into the machine to be controlled and wired into its control circuitry.

Figure 2:
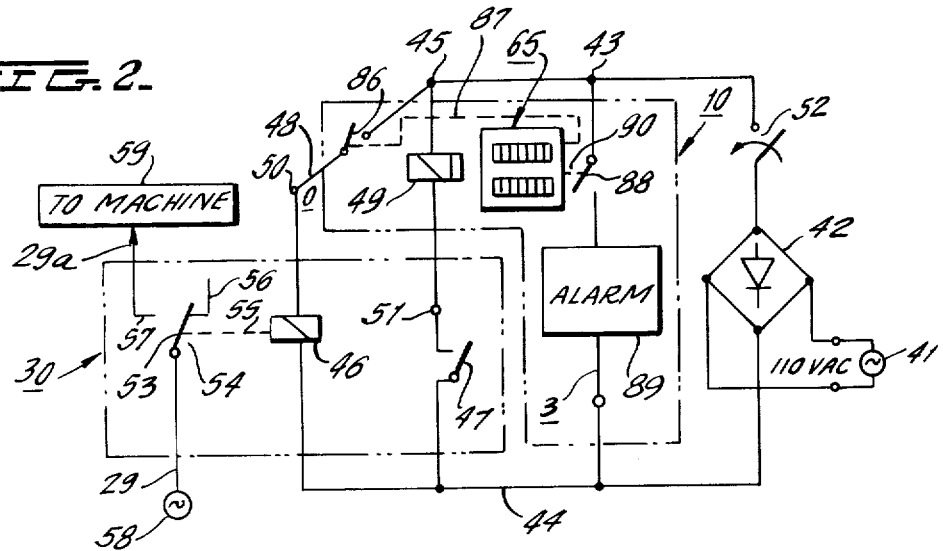
FIGS. 2, 3 and 5 are circuit diagrams showing three preferred electrical circuits which may be employed in the control devices of FIG. 1.

FIG. 2 shows the electrical circuit of one preferred embodiment of the present invention. The dotted rectangle 10 represents the electronic circuit provided within key counter device 10, while the dotted rectangle 30 represents the electrical circuit provided within control device 30. The circuitry of FIG. 2 is comprised of an alternating current source 41 which may, for example, be a 110 volt a.c. source which is coupled across two terminals of a diode bridge 42. The remaining two terminals of diode bridge 42 are coupled to conductors 43 and 44. Diode bridge 42 acts to full-wave rectify the a.c. signal produced by source 41. Conductor 43 is coupled to the socket 45, while conductor 44 is coupled in common to both one terminal of relay 46 and one terminal of a pulsing source 47. The key counter device 10 is provided with a shunting or bridge conductor 48 and a counter advancing coil 49. The shunt conductor 48 is coupled between the pins 45 and 50, while the terminals of counter coil 49 are coupled between the pins 45 and 51.

The devices 10 and 30 are operated by moving a switch 52 to the closed position, thus coupling d.c. (i.e., full-wave rectified a.c.) power to the circuit. Before powering the circuit, it should be noted that relay 46 has its armature mechanically coupled to the movable arm 53 of a contact switch arrangement 54, the coupling being represented by the dotted line 55. When de-energized, suitable bias means (not shown) which may, for example, be a spring, acts to maintain movable arm 53 into engagement with contact 56. Closure of switch 52, however, fails to provide any power to relay 46 due to the open circuit between points 45 and 50 when the key-counter device 10 is not inserted. By insertion of the key-counter device 10 into the control device 30 in the manner described hereinabove, and with the conductive pins 22 of key-counter 10 being received by the associated sockets of control device 30, an electrical path is established between terminals 45 and 50 by the bridging conductor 48 and an electrical path is established between circuit points 45 and 51 by counter coil 49. The insertion of device 10 thereby couples relay 46 to the energy source causing it to operate movable contact 53 out of engagement with stationary contact 56 and into engagement with stationary contact 57 so as to couple a power source 58 to a machine 59 which is placed under the control of control device 30 and which, for example, may be a copier machine.

Use of the control device 30 and key-counter device 10 in this manner completely avoids the need for a separate OFF-ON switch of the machine. For example, when coupled to a copier machine, insertion of the key-counter 10 may automatically operate as a device for placing the machine in the operating condition. Switch 52 is, therefore, not needed and may be omitted, if desired.

It is well known in the copier machine art that a great many of the copier machines presently available in the market require a rather lengthy warm-up time. It thus becomes quite impractical to constantly turn the machine ON and OFF, and it is, therefore, advantageous to permit the machine to be maintained in the ON condition and to connect the control device to the appropriate electrical circuitry within the copier machine which causes the actual printing of the copies. For this reason, it should be understood that switch 54 may be connected between a power source 58 and the appropriate electrical circuitry of machine 59 to merely control the actual production of copies as opposed to controlling the complete turn-on or turn-off of the copier machine.

As each copy is run off by the copier machine, suitable means are provided for operating the pulusing switch 47, as shown, or which may be any other suitable mechanical, electromechanical or electrical device sufficient to provide a pulse for operating counter coil 49 in order to develop a count within the key-counter 10 so as to advance its electromechanical counter by a count of ONE each time a copy is run off by the machine. The pulsing device employed may be the same device used to advance the counters employed within the copier machine itself. The counters of the copier machine may be any conventional counter device and has been omitted herein for the sake of brevity.

FIG. 2 shows a simplified key-counter device which may be employed with control device 30. The structure may be defeated by bridging a conductor across terminals 45 and 50, which may be accomplished by inserting a conductor into the appropriate sockets in the rear wall of control device 30. This would permit unauthorized personnel to defeat the locking function performed by the control device in a rather simple manner.

Figure 3:
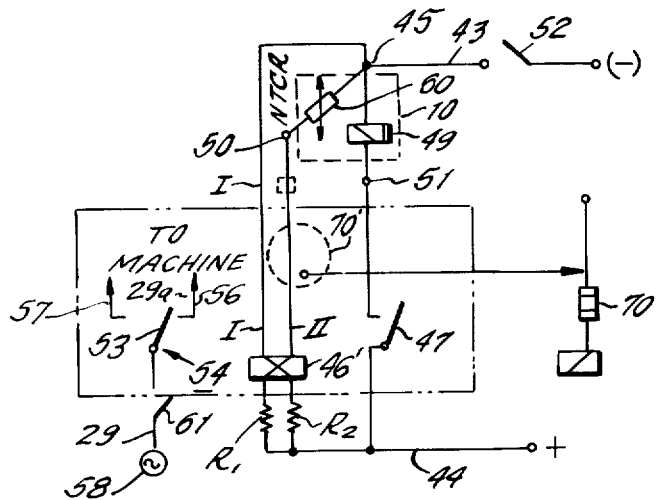

In order to provide a locking arrangement which is virtually impossible to defeat, the electrical arrangement of FIG. 3 may be employed. In the circuitry shown in FIG. 3, the control device 30 differs from that shown in FIG. 2 in that it is comprised of a relay structure 46' having independent relay windings I and II, respectively. Winding I is coupled between socket 45 and conductor 44. Winding II is connected between conductor 44 and socket 50. The windings are so arranged that the ampere-turns (NI) of the two windings counterbalance one another to prevent operation of the movable arm 53 of switch structure 54.

The electronics of key-counter device 10 in FIG. 3 differs from that shown in FIG. 2 in that a variable impedance device 60 has been substituted for the shunt conductor 48 of FIG. 2. Power source 41, diode bridge 42 and switch 52, as shown in FIG. 2, have been omitted from FIG. 3 only for purposes of simplicity, it being understood that the same structure or an equivalent thereof may be employed for powering the circuit of FIG. 3.

The negative temperature characteristic of the negative temperature coefficient resistor 60 is such that the resistance of device 60 decreases with increasing current. It should be understood that the resistance is a function of temperature which is related to current substantially by a constant of proportionality. Thus, as current increases, the resistivity of the device diminishes in accordance with its characteristic curve. A typical characteristic curve is shown in FIG. 4a of a similar control device described in U.S Pat. No. 3,436,530 issued Apr. 1, 1969 and assigned to the assignee of the present invention.

When no power is applied to the circuit of FIG. 3, coils I and II receive no current and are, therefore, incapable of operating movable arm 53. Thus, the normal biasing means of the movable arm (not shown), but which may be a spring means, maintains the movable arm 53 in the solid line position shown in FIG. 3.

With movable arm 53 in its right-hand position, power source 58 is coupled to terminal 56 which is, in turn, coupled to the machine (i.e., the copier machine). This condition is prevented by providing a second switch 61 in the power circuit, which switch is ganged with switch 52 so that when switch 52 is in the open position, switch 61 is open, and likewise when switch 52 is closed, switch 61 also closes. Thus, no power is supplied to either the windings I and II of relay 46', and the movable arm 41 will be maintained in the position shown in FIG. 2.

Resistors $R_1$ and $R_2$ are provided in the relay coil circuits I and II, respectively, in order to provide further means for limiting the current flow through these branches. If, for any reason, a change is required in a number of windings of either the relay coils I, II, or both, the resistors $R_1$ and $R_2$ may be selected in order to provide the desired number of ampere-turns to provide the counterbalancing feature. Resistors $R_1$ and $R_2$ may be made adjustable, if desired.

Considering winding I (it being understood that winding II has substantially identical characteristics), if the ampere-turns (NI) is below a predetermined level, the electromagnetic force is insufficient to operate movable switch arm 53 away from the position shown in FIG. 3. If the ampere-turns reaches or surpasses this predetermined level, the relay will operate to move arm 53 out of engagement with contact 56 and into engagement with contact 57. Having once come into engagement with contact 57, movable arm 53 may be held into engagement with this contact so long as the ampere-turns is at least equal to the above-mentioned predetermined level. If the ampere-turns is reduced to a magnitude below the predetermined level, movable contact 53 will be released from stationary contact 57 and will return to engagement with stationary contact 56.

Considering now the operation of the circuitry of FIG. 3, let it now be assumed that switch 52 is closed. This causes switch 61, which is ganged to switch 52, to likewise move to the closed position. This establishes a current path through conductor 43 and winding I to conductor 44 with the key-counter 10 removed from control device 30. This is the only electrical path established at this time. Energization of winding I produces ampere-turns of at least the above-mentioned predetermined level, which ampere-turn value is of sufficient magnitude to operate the relay causing movable contact 53 to be released from stationary contact 56 and to make engagement with stationary contact 57. Thus, no current path exists between power source 58 and the machine controlled by the control device.

Let it now be assumed that key-counter device 10 is appropriately inserted into control device 30. This places counter relay 49 into electrical series with pulsing source 47, and places the negative temperature coefficient impedance element 60 in electrical series with relay winding II and resistor $R_1$. The amount of current in this second path determines the temperature of negative temperature coefficient element 60 to establish its resistance in accordance with the current-resistance characteristic of the device. The current through winding II, coupled with the number of turns of winding II, acts to substantially balance the ampere-turns as between the two windings I and II so as to provide a resultant magnetic field which is extremely close to zero magnitude. At the time at which switches 52 and 61 are closed, winding I develops ampere-turns of a magnitude which is sufficient to operate relay winding I. The resistivity of the negative temperature coefficient resistance element 60 is substantially high when first inserted into the circuit as the inrush current enters the element, thereby causing its ampere-turns to be of a low value. As current passes through element 60, its resistance gradually decreases in accordance with its current-resistance characteristic, causing the ampere-turns developed by winding II to increase until the difference between the ampere-turns developed by winding I and the ampere-turns developed by winding II is equal to a "release" value which enables movable arm 53 to be released from stationary contact 57 and to engage stationary contact 56. This electrically couples power source 58 to the machine being controlled by the circuit. The resistance of element 60 continues to decrease until it tapers off to a substantially constant value, which value establishes an ampere-turns value which is substantially equal and opposite to the ampere-turns developed by winding I so that the resultant ampere-turns value developed by the pair of windings lies well below the "release" level. In order to further sophisticate the electronic "locking" feature, a timing device 70' may be provided which automatically shuts the machine down if the release level is not reached within the appropriate time duration so as to insure the fact that a negative coefficient element of appropriate reaction time is being inserted into control device 30.

The timing device 70' may comprise current or voltage sensing means which is coupled to a timing circuit means which begins to "time-out" under control of the sensing means as soon as the electrical key device is inserted. If the ampere-turns of windings I and II fail to balance one another before the timing device "times out" (due to either too low or too high resistance of element 60) then the machine will be automatically turned off by operative switch means (not shown) responsive to "time out" of the timing means and the failure of contact 53 to engage contact 56 before "time out" to energize an alarm and shut off the machine.

Further sensing means in the form of a fuse 70 may be employed to open the circuit between the power source and the control device 30 if the current magnitude in winding II is too great in the case where an unauthorized operator attempts to bridge terminals 45 and 50 with a short circuit condition.

Let it be assumed that an attempt is made to defeat the electronic locking function by bridging a shunt circuit across terminals 45 and 50. This constitutes a path of substantially zero resistance, causing the ampere-turns of winding II to reach a high level. This level is counterbalanced by the ampere-turns developed by winding I to develop a resultant ampere-turns level which is sufficient to operate movable arm 53 out of engagement with contact 56 and into engagement with contact 57, thereby disconnecting power source 58 from the machine being controlled by the circuit. It can thus be seen that a simple bridging circuit will not defeat the electronic locking function. If an effort is made to establish the resistance value of the negative temperature coefficient resistance element by taking a resistance measurement across the appropriate pins of the key counter device, the use of a typical ohm-meter to make such a measurement will not yield the desired result, since meters of this type are extremely low current devices. At low current, the resistance of element 60 is very high. If the resistance of this value is selected on the basis of such a measurement and bridged across terminals 45 and 50, the ampere-turns will reach a low level whereby contact 53 will still be maintained in engagement with contact 57 since the resultant level will be well above the "release" level.

In order to defeat the electronic locking device employing a negative temperature coefficient resistance, it would, therefore, become necessary to attempt to determine the resistance of element 60 by varying the current driven through this element, which is an extremely difficult operation to perform and which would certainly not be obvious to anyone making an effort to defeat the electronic locking device, as the contents of the key counter device 10 are completely sealed and substantially tamper-proof so that any effort to examine the contents of the key counter device 10 will involve destruction of the counter device. Thus, as a practical matter, it becomes virtually impossible to defeat the control device locking means.

In order to provide the function of preventing the run-off of any additional copies once the count of the electromechanical accumulating counter having number wheels 12a of FIG. 1 reaches the count set in the mechanically settable counter having number wheels 14a, the circuit of FIG. 4 may be employed. In FIG. 4, dotted rectangle 12a incorporates the logic employed in connection with the count section, while dotted rectangle 14a incorporates the logic employed in connection with the preset section counter. Considering the electromechanical counter, the solid line rectangles 70-1 through 70-6 represent the 100,000, 10,000, 1,000, 100, 10's, and unit count sections of the electromechanical switch. Considering the preset portion of mechanical counter, solid rectangles 71-1 through 71-6 represent the associated positions of the preset sections. Since the circuits of count sections 70-2 through 70-6 are substantially identical to the electrical circuitry contained in count section 70-1, and since the electronic circuitry of preset sections 71-2 through 71-6 is substantially identical to the electronics shown in preset section 71-1, only sections 71-1 and 70-1 will be described in detail for purposes of simplicity. The mechanical movement of the hundred-thousands number wheel is coupled to a rotatable arm 73 (by means not shown) and is selectively engageable with contacts 74-0 through 74-9 as the number wheel for the hundred-thousands decimal position moves from 0 through 9, respectively. For purposes of simplicity, terminals 74-0 through 74-9 are shown as being arranged in an arcuate path. As a practical matter, however, those terminals may be arranged around a complete circle so that when the number wheel for the hundred-thousands positions changes from "9" to "0," arm 73 will engage terminal 74-0 after having left terminal 74-9.

In a similar fashion, the number wheel for the hundred-thousands position of the mechanical counter having number wheels 14a is mechanically coupled to a movable arm 75 which is engageable with the contacts 76-0 through 76-9, respectively. The contacts 76-0 through 76-9 are also shown for simplicity's sake as being arranged in an arcuate manner, but it should be understood that these contacts may likewise be arranged around a full circle to enable movable arm 75 to immediately engage terminal 76-0 after leaving terminal 76-9 when the hundred-thousands number wheel is changed from the number "9" to the number "0."

Electrical leads 77 respectively connect terminals 74-0 through 74-9 to terminals 76-0 through 76-9. The electrical circuits count sections 70-2 through 70-6 are electrically connected to the electrical circuits of preset sections 71-2 through 71-6 in a similar manner.

An electrical lead 78 connects the movable arm 73 of count section 70-1 to the movable arm contained in preset section 71-2, and electrical lead 79 connects the movable arm of count section 70-2 to the movable arm of preset section 71-3. Leads 80, 81 and 82 are connected in a similar fashion. The movable arm (not shown) of count section 70-4 is further electrically connected to relay coil 83, while the movable arm of preset section 70-6 is connected to relay coil 84. Movable arm 75 is connected to power source 85.

In operation, let it be assumed that the hundred-thousands number wheel of the preset section 71-1 is set at the decimal number "7." In this condition, movable arm 75 electrically engages terminal 76-7. As soon as the hundred-thousands position of the counter section 70-1 of the electromagnetic counter has its number wheel presenting the decimal number "7," its movable arm 73 will electrically engage terminal 74-7, establishing an electrical path from power source 85, movable arm 75 and terminal 76-7 of preset section 71-1, the appropriate electrical lead of lead group 77, terminal 74-7 and movable arm 73 to lead 78. In a like manner, each of the counter and preset sections of the remaining digit positions (10,000's, 1000's, 100's, 10's, and units) will establish a similar electrical circuit when the number wheels 14a of the mechanical counter and the number wheels 12a of the electromagnetic path are equal, to establish a circuit from power source 85 through relay coil 84 to ground potential 86 to thereby energize relay coil 84. Turning to FIG. 2, the circuitry 65 of FIG. 4 energizes relay coil 84 which has its armature (not shown) mechanically coupled to a normally closed switch 86 connected between terminals 45 and 50, which mechanical connection is represented by dotted line 87. Thus, when the counts of the preset sections and the counter sections of the electromagnetic counter are identical, relay coil 84 is energized to open normally closed switch 86, thereby deenergizing relay coil 46 and causing switch 53 to move away from engagement with stationary contact 51 so as to prevent any further operation of machine 59.

In order to provide an advance warning of the fact that the total number of copies, which may be run off through the use of the key counter device, is closely approaching the amount set in the mechanical counter, relay coil 83 is connected to the movable arm (not shown) of counter section 70-4 (the hundreds position). Relay coil 83 has its armature (not shown) mechanically coupled to normally open switch means 88 which is connected in series with an alarm device 89, the mechanical connection being represented by dotted line 90. Switch 88 and alarm 89 are connected across conductors 43 and 44.

Prior to the time that the 100,000's, 10,000's, 1,000's, and 100's position of both the mechanical counter and electromagnetic counter are not all presenting the same identical readings, no electrical path will be established between power source 85 and relay 83. However, when these readings are exactly alike, relay coil 83 will become energized to cause its armature to close switch 88 (the mechanical connection being shown by dotted line 90) and thereby energize alarm 89. Alarm 89, as described hereinabove, may be comprised of either a visual or audible alarm device to indicate to the operator that only 99 copies can still be run off with the key count device 10 before it must be reset. Obviously, if desired, relay coil 83 may be connected to any other position such as the tens or thousands position, for example. The relay 83 is caused to "lock-in" by operating relay contact 83a to continuously provide power for relay 83, if desired.

The logic of FIG. 4 may be substituted by a mechanical coincidence device as shown in FIG. 4a in which each of the number wheels 14a (only four being shown for purposes of simplicity) is provided with a groove 14b. The number wheels are set in accordance with the quantity desired to be provided in the electrical key device. The number wheels are mechanically coupled to adjacent number wheels and are either operated to accumulate counts from zero upward or to decrease the count from a preset number towards zero.

A shaft 130 provided with discs 131a through 131d has its opposite ends 130a and 130b positioned within elongated slots 132a and 133a provided in members 132 and 133, respectively. Spring means 134 and 135 normally urge shaft 130 generally downwardly. However shaft 130 is prevented from moving downwardly until all of the grooves 14b are aligned along an imaginary straight line which is in spaced parallel alignment with shaft 130. As soon as all of the number wheels 14a are so aligned, all of the discs 131a-131d will fall into the grooves 14b of their associated number wheels thereby enabling the end 130b of shaft 130 to be urged against the sensing arm 135a of a normally open microswitch 135. Closure of switch 135 energizes relay 84 by coupling power source 85 to relay 84 through switch 135. contact 84a may be employed to "lock-in" relay 84.

The warning signal which indicates that the quantity set into the electrical counter is nearing depletion may be generated by the mechanical coincidence device of FIG. 4b, which is similar to that shown in 4a.

The assembly of FIG. 4b shows the number wheels 14a provided with grooves 14b positioned adjacent the left-hand vertical surfaces of the number wheels 14a. FIG. 4b further shows a similar set of grooves 14c provided adjacent the right-hand vertical surfaces of the number wheels. These grooves cooperate with a linearly movable shaft 136 having a plurality of discs 137a-137d each rigidly secured to shaft 136 and being spaced at intervals along said shaft so as to cooperate with grooves 14c of their associated number wheels 14a. In a manner similar to that described with respect to FIG. 4a, the ends 136a and 136b of shaft 136 are arranged to be movable within slots 137a and 138a provided in members 137 and 138, respectively. Spring members 139 and 141 are arranged to normally urge shaft 136 in the upward direction when all of the grooves 14c are in alignment with their associated discs 137a-137d which indicates that a count has been reached, which count is slightly less than zero so as to provide an indication that the quantity set into the electrical key counter device has been nearly depleted. When the grooves 14c are aligned with discs 137a-137d, respectively, biasing members 139 and 141 urge shaft 136 substantially in the upward vertical direction to cause the discs 137a-137 d to snap into the grooves 14c of their associated number wheels 14a. The upward vertical movement of shaft 136 is imparted to the sensing arm 140a of a microswitch 140 to close the microswtich contacts and thereby establish a current path from power source 85 through the closed contacts of microswitch 140 and relay 83 to ground potential. Relay means 83 may be provided with a second switch contact pair 83b mechanically coupled to relay means 83 as shown by dotted line 83c so as to lock-in relay 83 after closure of microswitch 140 to provide a constant illumination (or ringing) of the alarm device.

It should be understood that other approaches to the electrical and mechanical coincidence circuits may be employed to obtain deactivation of the electrical key device. Suitable mechanisms to perform these functions are discussed in the previously mentioned Hecon Catalog such as, for example, the FA 043 and the FE 043 Counters described in the aforesaid Hecon Catalog.

To reset the key counter device so that it may again be used to run off a predetermined number of copies, the key counter device is unlocked by placing the appropriate key within key-operated lock 20 so as to release the enclosure 16 from its locked position. Once the enclosure is unlocked, it may be swung open to gain access to a reset button 92 provided on the front face of the key counter device immediately adjacent and to the left of window 12. Depression of button 92 automatically resets th eelectromechanical counter to a reading of 000,000. In instances where it is desired to alter the number of copies which the key counter device is permitted to run off, manual control knob 15 may be manipulated to alter the setting of the mechanical counter having number wheels 14a so as to change the number of copies which may be run off to either a greater or lesser amount than that to which the key counter was previously set. The enclosure 16 is then swung back to the closed position and locked to prevent any access thereto by unauthorized personnel. This key counter device thereby provides the means by which the number of copies which may be run off in a copier machine controlled by the devices 10 and 30 may be easily and accurately regulated. For example, the key counter device 10 may be reset only after the user has first paid for the number of copies set in the mechanical counter. As another alternative, the setting of the mechanical counter may be selected in accordance with the credit rating of the user or may be set to permit the user to run off a number of copies substantially equivalent to that normally run off by the user within a preset time period such as one month, wherin payment of the number of copies run off for one month must be made at the end of the month before the key counter can be set in readiness for use for the next month. Obviously, any other arrangement may be made, it being understood that the key counter can be carefully regulated by the copier machine lessor in accordance with his own business practices.

The quantity regulating mechanism, as shown in FIGS. 2 and 4, have been omitted from the circuit of FIG. 3 for purposes of simplicity, it being understood that the quantity regulating control circuit may be employed in this arrangement as well.

As another alternative to the arrangement shown in FIG. 4, the two counter devices having number 12a and 14a, respectively, may be replaced by a single reversible counter Model FB 043.01 described in Hecon Catalog No. 043768 which is initially advanced to a predetermined count by either electronic or mechanical means. The pulsing device represented by mechanical switch 47 of FIG. 2, for example, is electrically connected in circuit with the coil for the reversible counter so as to pulse the counter in the reverse direction so that it operates as a count-down counter. An electrical circuit similar to that shown in FIG. 4 may be employed wherein the electrical circuitry in dotted rectangle 14a may be omitted and wherein the zero terminals of each of the rectangles 70-1 through 70-5 are electrically connected to the movable arm of rectangles 70-2 through 70-6, respectively, so as to complete an electrical circuit which includes coil 84 which becomes energized when the setting of each counter decimal digit position reaches "0."

Figure 5:
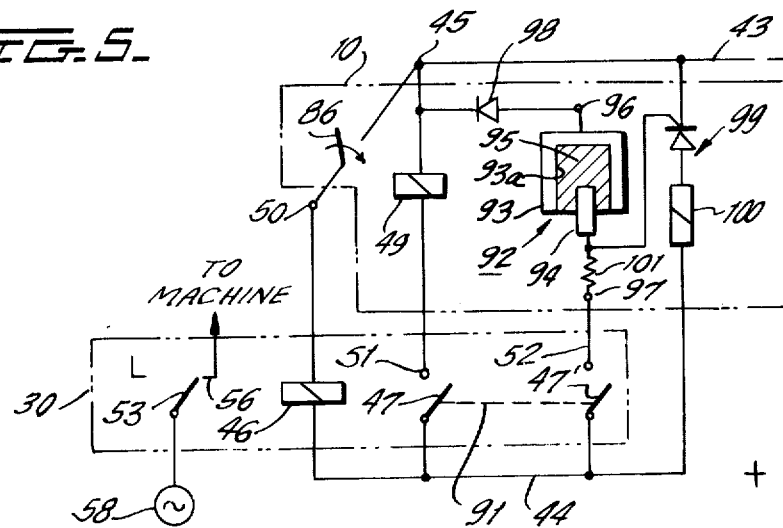

FIG. 5 is a schematic diagram showing still another alternative embodiment of the present invention in which the dotted outline 10 represent the key counter device and in which the dotted outline 30 represents the control device. In this embodiment, the key counter device is plugged into the control device to couple normally closed switch means 86 across terminals 45 and 50, to couple relay coil 49 across terminals 45 and 51 and to couple a control circuit 90 across terminals 45 and 52. The control device 30 is modified so as to provide two sockets 51 and 52 each having an impulse generating device in the form of a mechanical switch 47 and 47' connected thereto. The mechanical switches are ganged to one another as represented by dotted line 91 so as to operate in unison.

The quantity contolling circuit 90 is comprised of an electrolytic cell which may, for example, be a coulombmeter device. Such electrolytic cells may be used to provide a storage of information through the transfer of an active material from the first electrode to a second electrode by the passage of current through the coulombmeter. The coulombmeter 92 is typically comprised of an outer housing 93 which serves as the first electrode and an inner electrode 94 extending into and insulated from electrode 93. At least the interior surface of 93a of the first electrode is coated with an active material such as silver. The exterior surface of the second electrode is coated with an inert material such as, for example, gold so as to serve as a plating surface for the active material. The interior region is filled with an electrolyte 95 such as a liquid or solid electrolyte.

Obviously any electrolytic cell structure may be employed, depending only upon the needs of the user. Typical devices of this type are set forth in the text *Standard Handbook for Electrical Engineers*, published by the McGraw Hill Book Company, 10th Edition, copyright 1968. The pertinent sections of this book are Section 23 (See Paragraphs 1–24 of this section) and Section 3 (See Paragraph 86 of this section).

The coulombmeter 92 may be used as a storage element by passing current through the device so as to place the active material from first electrode 93 upon the surface of the second electrode, whereby the amount of plating is controlled by the parameters of time and current. The stored quantity may be read out at a subsequent time by the passage of a current in a direction to deplate the active material from the second electrode back to the first electrode.

Devices of this type have a voltage characteristic which changes with a change in the amount of plating to provide an indication when all of the stored material has been deplated. The coulombmeter has a low resistance when active material is plated on the second electrode. As active material is deplated, the coulombmeter exhibits low resistance until the plated active material is decreased to a very small amount. Toward the end of the deplating operation, the resistance of the coulombmeter begins to increase until the increased resistance starts to occur at a rapid rate as the cell is completely deplated. A change in resistance may be advantageously employed in the circuit of FIG. 5.

Coulombmeter 92 may first be operated so as to plate the active material from clectrode 93 upon electrode 94 before insertion of a key counter into the control device. The amount of plating provided may be determinative of the total number of copies for which the key counter is to be set. This may be performed by connecting a pulsing instrument for generating either short constant width pulses or a long time controlled pulse, to the device 92. The key counter may be provided with suitable sockets, represented by terminals 96 and 97 in FIG. 5, into which appropriate leads may be connected so as to easily and directly pulse the coulombmeter. Once the desired amount of plating is provided, the key counter may be inserted into the control device so that the electronic circuitry is arranged in the manner shown in FIG. 5.

With the key counter device 10 inserted, normally closed switch 86 establishes a current path between conductors 43 and 44 to energize a sensing device 56 to thereby operate a switch 53 to engage contact 56 and thus couple power source 58 to the copier machine.

The coil 49 of the electromagnetic counter provided in the key counter device 10 is also connected between leads 43 and 44 and acts to advance the count of the electromagnetic counter by one count each time the impulse device (i.e., switch) 47 is closed. This closure occurs each time a copy is produced by the machine. If desired, the counter of the device 10 may be eliminated since the total number of copies produced by the user with the electrical key device may be determined by ascertaining the number of individual pulses or the time duration of a single long pulse required to totally deplate the coulombmeter. Obviously, the coulombmeter may be charged to an extent which does not exceed the estimated amount of copies which the customer may produce in a month, or, alternatively, so as not to exceed by an amount greater than ten precent (for example), the estimated number of copies which a customer produces in a month. The key counter may then be tested at the end of each one month period. If the charge of the coulombmeter is completely depleted, the number of copies which the customer is to be charged for can be immediately ascertained simply by determining the amount of plating originally inserted into the coulombmeter. If the coulombmeter charge is not completely depleted, the pulse generating device need only ascertain the number of pulses (or the length of a single pulse) required to totally deplete the plating in the coulombmeter. This quantity, when subtracted from the original amount stored therein will yield a difference equal to the number of copies produced by the customer during that one month period.

The coulombmeter is coupled between terminal 52 and terminal 45 and is further connected in electrical series with a diode 98 which controls the direction of current flow through the electrolytic cell. An SCR 99 is connected in series with relay 100, and these series connected elements are connected across leads 43 and 44. The control electrode 99a of SCR 99 is electrically connected between the common terminal of a resistor 101 and one terminal of coulombmeter 92. In operation, as each copy is produced, the impulsing devices (i.e., switches) 47 and 47' close in unison, causing relay coil 49 to advance the count in the electromagnetic counter and further causing the electrolytic cell to be deplated by a predetermined amount. Each time a copy is run off, the amount of plating on the second electrode 94 is diminished. As soon as the second electrode 94 of the coulombmeter is almost completely deplated, the resistance value across the electrolytic cell is quite high. Thus, a subsequent closure of switch 47' will provide a voltage level at control electrode 99a sufficient to turn on the SCR 99. This current path causes encrgization of relay coil 100 which operates its armature, which is mechanically coupled to normally closed switch 86 (by means not shown) to open switch 86 and thereby disconnect relay coil 46 from power source 41 (see FIG. 2). Relay coil 100 remains locked in due to the nature of the SCR 99.

As another alternative, SCR 99 may be replaced by other types of voltage-sensing or current-sensing devices which note the changes in voltage or current respectively across or through the electrolytic cell 92 in order to actuate and move the normally closed switch to the open position.

The key counter device 10 may then be removed from the control device and have its electrolytic cell replated to permit subsequent operation of the copier machine under control of the replenished key counter device. If desired, a second SCR or sensing device may be coupled across the electrolytic cell to sense the current or voltage condition of the electrolytic cell as it approaches the condition of being completely deplated. This sensing operation may then be utilized to provide an alarm indication to observers that the key counter device must be replenished shortly.

In order to prevent replenishment or replating of the coulombmeter by unauthorized personnel, the sockets 96 and 97 provided upon one surface of the key counter device may be mounted beneath a cover plate or enclosure which may be locked with a key when in the closed position. For example, the sockets for electrically connecting the coulombmeter to the replenishing instrument may be positioned behind the enclosure 16, shown in FIG. 1 of the application, or the enclosure may be a hinged lid provided on any other surface of the key counter device.

The instrument employed to replenish the coulombmeter may be provided with substantially tamper-proof counter means to guarantee that any replenishment of the electrolytic cell will be recorded within the counter of the replenishing device. Thus, for example, the lessor of copier machines may provide each of its salesmen, technicians, or other agents with a replenishment device which may be used in the field and returned at the end of each day or week to the lessor's headquarters in order that the readings of each replenishment device may be recorded to ascertain the exact quantities of replenishment which each agent of the lessor has provided for the lessor's customers.

Considering the embodiment of FIG. 1, the replenishment of the key counter device shown therein may similarly be reset in a controlled manner by providing an instrument 110 of the type shown in FIG. 6. The instrument 110 is provided with a pulse generator contained within housing 111 having its output coupled through a lead 112 to a socket 113 having pins 114 which may be coupled into suitable socket openings 115 provided above the number wheels 14a of the key counter device electromechanical counter. The replenishment device 110 of FIG. 6 is further provided with an electromagnetic counter (not shown) having number wheels 116 which may be viewed through a window 117 provided on the front face of instrument 110. The electromechanical counter having number wheels 116 would also be electrically connected (by means not shown) to the pulse generator contained within the housing. The front control panel is further set in the units, 10's, 100's, 1,000's, 10,000's, and 100,000's, for example, quantity to be set into the pulse generator to therefore determine the quantity to be set into the key counter device. A switch control 119 is then turned on after the pins 114 are plugged into the sockets 115 whereby the replenishment device 110 will generate pulses which will advance the electromagnetic counter having number wheels 116a in key-counter device 10. In this particular embodiment, it should be understood that the counter having number wheels 14a should be an electromagnetic counter having a stepping coil or coils capable of advancing the count of the counter as each pulse from the pulse generator in replenishment device 110 is generated. Assuming that the electromagnetic counter provided in the key counter device and having number wheels 14a, is capable of being stepped at a rate of 80 pulses or counts per second, it would be possible to place a count of 1,000 in the key-counter device in approximately 2 minutes. This arrangement has the advantage over that of simply providing a mechanically operable knob 15, as shown in FIG. 1, since this arrangement provides a very accurate count of the number of counts "sold" to any given customer by means of checking the tamper-proof counter having number wheels 116 provided in each replenishment device 110.

Other techniques may be employed for preventing unauthorized access to an electrical key device. For example. FIG. 6 shows a portion of the housing of an electrical key device of the automatically resettable type wherein number wheels 12a are those employed for the electromagnetic accumulative counter and wherein number wheels 14a represent the preset section. The front face of the housing is provided with a manually depressible reset button 150. Assuming that the amount preset in the counter has been depleted, the electrical key device may be reset to replace the identical amount therein. This is done by depressing button 150 in a direction shown by arrow 151. In order to prevent the free resetting by unauthorized personnel, a latching assembly is provided. The latching assembly is comprised of the reset arm 150 having a rectangular shaped opening 150a at a position along the reset arm located within the tamper-proof housing. A thin rod 152 is normally urged by a spring mechanism 153, shown positioned between the left-hand end of rod 152 and the housing wall normally urges rod 152 through opening 150a. Mcans (not shown) may be provided to guide rod 152 so as to prevent this rod from experiencing any movement transverse to its longitudinal direction. The spring means 153 normally urges rod 152 in the direction shown by arrow 154 so as to protrude through opening 150a thereby preventing depressing of reset button 150. Rod 152, in turn, is provided with a circular shaped opening 152a which receives a pin member 155. Means (not shown) may be provided within the tamper-proof housing to prevent pin from moving in a direction transverse to its length. Rod 155 is normally urged into opening 152a by a second spring means 156 positioned between the right-hand end of pin 155 and a second wall of the tamper-proof housing. With pin 155 inserted in opening 152a and with rod 152 inserted in opening 150a, reset button 150 is prohibited from moving in the direction shown by arrow 151 to reset the tamper-proof electrical key device. In order to permit resetting of the electrical key device, a magnetic member 158 capable of generating a strong magnetic field and which may either be a permanent magnet or an electromagnet, is positioned adjacent the bottom wall of the key counter device and in close proximity to pin 155. The magnetic field is of sufficient field strength to overcome the biasing force of spring 156 so as to withdraw pin 155 from opening 152a. A second magnetic member represented by dotted rectangle 157 is then positioned adjacent the side wall of the tamper-proof housing and in close proximity to rod 152. This electromagnet is positioned adjacent rod 152 only after pin 155 has been removed from opening 152a. The field strength of device 157 is of a strength sufficient to withdraw rod 152 from opening 150a against the biasing force of spring means 153. The sequential use of the magnetic members in the order set forth hereinabove thereby frees the reset pushbuttom 150 to operate in a direction shown by arrow 151 to reset the counter mechanism. Obviously, if desired, pin means 155 may be eliminated. It should be understood that the rod 152 and pin 155, or at least the end portions thereof, are formed of a magnetically attractive material sufficient to permit these members to be withdrawn from their associated openings against biasing force of their associated spring members.

As another alternative arrangement, all of the electrical key devices may be designed so as to prevent simple resetting of the devices. For example, large batches of electrical key devices may be manufactured with each batch set to a predetermined count. The key counter devices are then distributed amongst the customers on a monthly or other periodic basis. Maintenance, personnel, sales personnel, or other personnel of the vendor may then pick up the key counter devices at each of their customer locations and replace the key counters with another counter previously set to the identical quantity so as to avoid the need for resetting counters at the customers' location.

It can be seen from the foregoing description that the present invention provides novel conrtol apparatus for controlling the operation of copier machines, computers, machine tools, automobiles, and other like devices wherein the customer is provided with key counter devices which may be dispensed to authorized personnel to prevent the use of the machine being controlled except by those personnel possessing a key counter and further to provide excellent regulation over the use of the machine and over the payments made by the lessee to the lessor for the use of the machine by very accurately limiting the operating time or quantity output of the machine being so controlled through the use of key counter devices which further prevent the use of the machine after the time or quantity values initially stored in the key counter device are depleted. Replenishment of key counter devices for subsequent use may thus be placed under the strict regulation of agents of the machine owner or lessor to limit the amount of credit granted to any customer or, alternatively, to prevent the usage of the machine by the customer unless and until the replenished amount inserted into the key counter is paid for by the party renting or leasing the macnine with the control device.

Although this invention has been described with respect to its preferred embodiments, it should be understood that many variations and modifications will now be obvious to those skilled in the art, and it is preferred, therefore, that the scope of the invention be limited not by the specific disclosure herein but only by the appended claims. For example, the control means 30 of FIG. 1 may be utilized within a gas driven or electrically driven vehicle. The electrical key device 10 may be utilized as the equivalent of a mechanical ignition key which when inserted permits usage of the vehicle. Stepping of the counter within the electrical key device (or the coulombmeter) may be placed under control of the odometer. The amount of miles driven may be established either by reading the accumulative type counter provided within the key device 10 or, alternatively, may be established by determining the amount of deplating experienced by the coulombmeter in cases where the key device is otherwise not provided with a visually observable counter.

The embodiments of the invention in which an exclusive privilege or property is claimed are defined as follows:

1. Control means for preventing unauthorized use of a machine controlled by an electric power source and for limiting the amount of such authorized use comprising:

a control device including first means coupled between the electric power source and the machine and being movable between a first position disconnecting said machine and said source and a second position for connecting said machine and said source;

second means for normally maintaining said first means in said first position;

normally deenergized third means for operating said first means to said second position when energized;

said third means including a receptacle;

an electrical key device mounted within a tamperproof housing and having circuit establishing means keyed to be removably inserted into said receptacle for energizing said third means;

first counter means mounted within said key device, said first counter means including altering means for changing the count of said counter means;

settable means within said housing for presetting the counter means to any predetermined count;

latch means on said housing for preventing access to said settable means;

manually operable means in said housing accessible only upon operation of said latch means for substantially instantaneously resetting said first counter to the count set in said counter by said settable means;

pulsing means in said control device for energizing said altering means when said machine is energized to record the amount of use of the machine;

said circuit establishing means including sensing means for deenergizing said third means when a predetermined amount of use of the machine has been sensed;

said first counter means comprising an electrolytic cell;

said sensing means comprising means for sensing the state of said electrolytic cell;

means external of said housing releaseably connected to said electrolytic cell for plating the cell by a predetermined amount;

said settable means further including signal generating means for generating a signal to be coupled to said cell;

adjustable means connected to said signal generating means for controlling the time duration of said signal to control the amount of plating;

said setting means further comprising a tamper-proof recording means for recording the amount of plating set into the cell.

* * * * *